(12) United States Patent
Shemer et al.

(10) Patent No.: US 11,386,118 B2
(45) Date of Patent: Jul. 12, 2022

(54) PHYSICAL TO VIRTUAL JOURNAL CASCADING

(71) Applicant: EMC IP Holding Company LLC, Hopkinton, MA (US)

(72) Inventors: Jehuda Shemer, Kfar Saba (IL); Arieh Don, Newton, MA (US); Saar Cohen, Moshav Mishmeret (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 135 days.

(21) Appl. No.: 16/655,376

(22) Filed: Oct. 17, 2019

(65) Prior Publication Data
US 2021/0117440 A1    Apr. 22, 2021

(51) Int. Cl.
*G06F 16/27*    (2019.01)
*G06F 11/14*    (2006.01)

(52) U.S. Cl.
CPC .......... *G06F 16/27* (2019.01); *G06F 11/1451* (2013.01)

(58) Field of Classification Search
CPC ...... G06F 16/27; G06F 16/273; G06F 16/275; G06F 16/278; G06F 2201/855; G06F 3/0665; G06F 16/188; G06F 16/196; G06F 3/065; G06F 16/128; G06F 16/1805; G06F 16/1815; G06F 11/1451; G06F 11/1471; G06F 11/2028; G06F 11/2038; G06F 11/2048; G06F 11/2094; G06F 11/2097; G06F 2201/815; G06F 2201/84
See application file for complete search history.

(56) References Cited

U.S. PATENT DOCUMENTS

| | | | | |
|---|---|---|---|---|
| 6,779,003 | B1* | 8/2004 | Midgley | G06F 11/2071 |
| 8,799,211 | B1* | 8/2014 | Bezbaruah | G06F 16/184 |
| | | | | 707/610 |
| 9,081,754 | B1* | 7/2015 | Natanzon | G06F 11/2064 |
| 2006/0174076 | A1* | 8/2006 | Takeda | G06F 11/2071 |
| | | | | 711/162 |
| 2007/0162516 | A1* | 7/2007 | Thiel | G06F 16/273 |
| 2008/0133208 | A1* | 6/2008 | Stringham | G06F 11/0712 |
| | | | | 703/20 |
| 2009/0204774 | A1* | 8/2009 | Matsui | G06F 11/2064 |
| | | | | 711/162 |
| 2009/0300304 | A1* | 12/2009 | Boyd | G06F 16/27 |
| | | | | 711/E12.103 |
| 2011/0161295 | A1* | 6/2011 | Ngo | G06F 11/1446 |
| | | | | 707/639 |
| 2013/0024722 | A1* | 1/2013 | Kotagiri | G06F 11/1004 |
| | | | | 714/6.1 |
| 2013/0262638 | A1* | 10/2013 | Kumarasamy | H04L 67/34 |
| | | | | 709/221 |
| 2014/0068210 | A1* | 3/2014 | Deguchi | G06F 11/2058 |
| | | | | 711/162 |

(Continued)

*Primary Examiner* — David T. Brooks
(74) *Attorney, Agent, or Firm* — Workman Nydegger

(57) ABSTRACT

Systems and methods for replicating data from storage. Snapshots are taken on a consistency group of volumes and are stored in snapshot volumes. Changes to the data stored in the volumes are identified from the snapshots and the changes are written to a journal. The journal allows the changes to be replicated to a virtual replication system and a physical replication system. The journal can be replicated to different systems, including physical and virtual systems, by exposing the same journal in different manners.

20 Claims, 4 Drawing Sheets

(56) References Cited

U.S. PATENT DOCUMENTS

| | | | |
|---|---|---|---|
| 2014/0279884 A1* | 9/2014 | Dantkale | G06F 16/182 |
| | | | 707/620 |
| 2016/0224434 A1* | 8/2016 | Winokur | G06F 11/1474 |
| 2017/0235652 A1* | 8/2017 | Natanzon | G06F 11/1451 |
| | | | 714/6.3 |
| 2017/0277443 A1* | 9/2017 | Deguchi | G06F 11/14 |
| 2017/0315874 A1* | 11/2017 | Patnaik | G06F 11/2094 |

* cited by examiner

PHYSICAL TO VIRTUAL JOURNAL CASCADING

FIELD OF THE INVENTION

Embodiments of the present invention generally relate to systems and methods for performing data protection operations. More particularly, at least some embodiments of the invention relate to systems, hardware, software, computer-readable media, and methods for performing data protection operations including replication operations.

BACKGROUND

Data protection operations generally relate to the concept of protecting data. Data can be protected in a wide variety of ways. The primary method for protecting data is to generate backups of production data. In the event of a problem with the production data, the backups can be used to resolve the problem.

However, there are many different types of data protection operations. Data replication, for example, generally relates to the concept of replicating data from a source to a target. The details, however, are much more complicated. For example, the management paradigm for virtual replication systems and physical replication systems are distinct and different. A physical replication system is not able to simply replicate the data to a virtual system. The ability to replicate data to both a physical system and a virtual system is further complicated by the fact that physical entities (e.g., logical unit numbers or LUNs) are not present or prevalent in cloud offerings.

In addition, there are different types of replication. Differential replication (e.g., using snapshots) is discrete by nature while a point in time (PiT) replication system is often stream based in nature. Consequently, the ability to replicate data in both a physical and a virtual system is not trivial.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
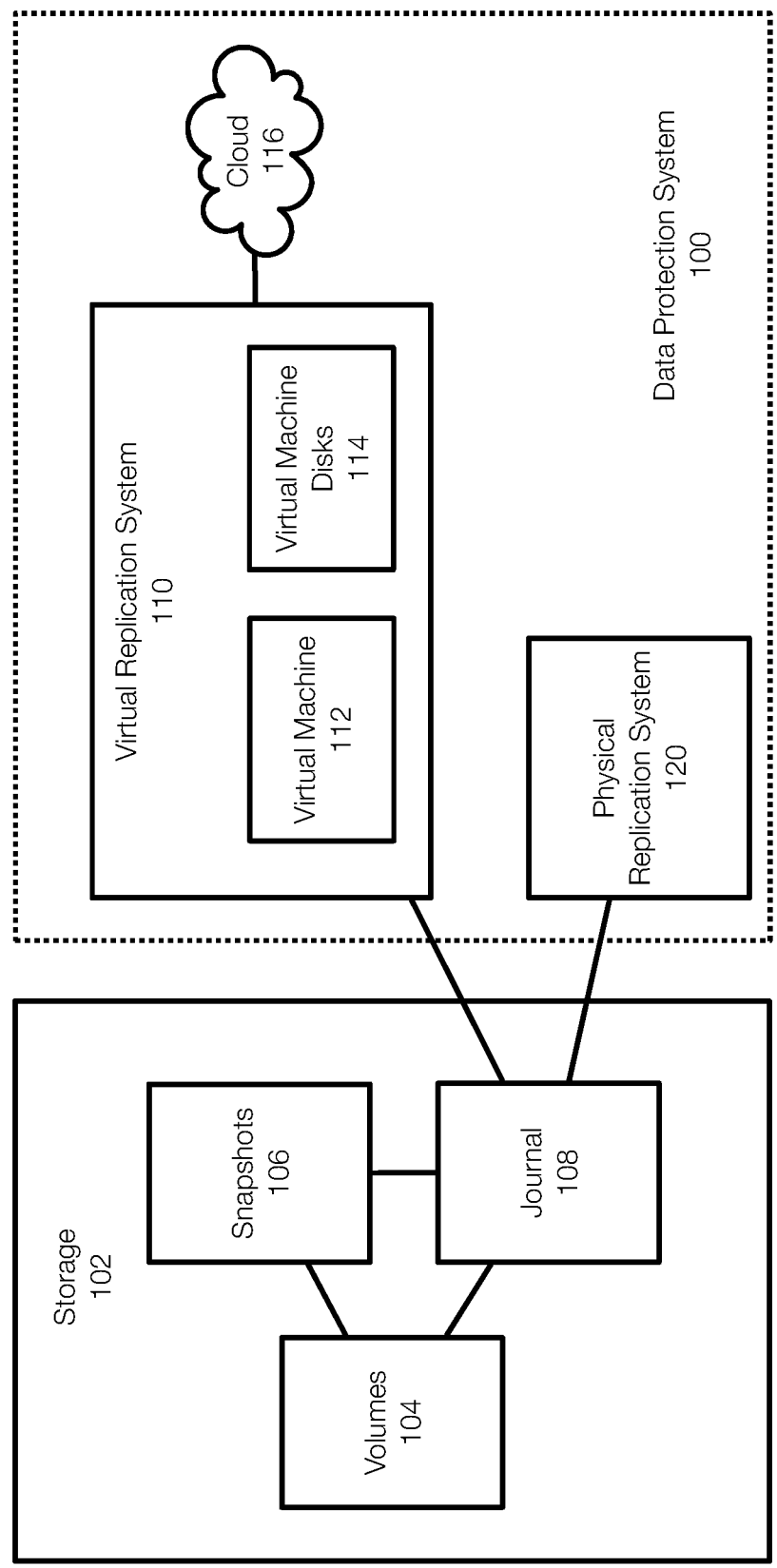
FIG. 1 illustrates and example of a data protection system that includes a physical replication system or component and a virtual replication system or component.

Embodiments of the present invention generally relate to data protection operations. At least some embodiments of the invention relate to systems, hardware, software, computer-readable media, and methods for performing data protection operations. Examples of data protection operations include, but are not limited to, replication operations, cascading operations, backup operations, restore operations, replication operations, disaster recovery operations, and related operations. Embodiments further relate to physical to virtual journal cascading, where a journal is used to replicate data to both virtual and/or physical replication or data protection systems. Embodiments may be performed in local area networks (LAN), wide area networks (WAN), cellular networks, and/or cloud networks or combinations thereof.

In general, embodiments of the invention relate to systems and methods for converting or handling physical data, such as physical snap-based replication (SBR) data, such that the data is compatible with a virtual system (e.g., a virtual business continuity and disaster recovery (BCDR) system). Embodiments of the invention are configured to replicate data to a physical system and/or a virtual system. Embodiments of the invention may replicate data from production data and/or images, snapshots, or other copies of production data. Dell EMC RecoverPoint Data Protection Software and/or related appliances are examples systems in which embodiments of the invention may be implemented. Embodiments may be implemented, for example, on EMC VNX and XtremIO platforms or other storage platforms.

In one example, embodiments of the invention may include taking snapshots of data such as production data. Using the snapshots, changed data can be identified and stored in a storage such as a journal (also referred to herein as a journal volume). A physical system may interface with the journal to replicate the data and a virtual system may also interface with the journal in a different way to replicate the data. This allows the production data to be protected using virtual machines and facilitates use of the replicated data in an environment such as a cloud-based storage environment.

Identifying changes to source data in snap based replication has many options. In one example, the snapshots may use change block tracking or other differential mechanisms that allow the areas or blocks that have actually changed to be transferred or replicated efficiently. More specifically, changed data or blocks can be tracked from a particular point in time such as the last time a backup of snapshot was performed. Changes to data can be used based on a differential between a current snapshot and a previous snapshot. A bitmap may be used to identify changed blocks. Embodiments of the invention are able to identify the data that has changed with respect to a snapshot such as a current snapshot. The changed data can be replicated.

Embodiments of the invention, after identifying the changed data, write the changed data to a journal. The journal (or other storage volume) may be exposed or mounted as a device (e.g., a SCSI device) such that a replication appliance (an example of a physical replication system) can read the journal and replicate the source data to a target. At the same time (or at a later time), the journal or storage volume may be exposed using raw device mapping (RDM) such that the journal or storage is exposed as a virtual volume (e.g., a VMDK) to a virtual machine. Virtual machine IOs can be read/written directly to the volume without virtualization when the storage is exposed using RDM. This is distinct from creating a virtual machine file system on each storage logical unit number (LUN), creating VMDK files, and encompassing a virtual machine volume therein.

Embodiments of the invention use a journal, by way of example, as a cascading mechanism to connect and replicate data from a physical system to a virtual system. Embodiments of the invention further allow physical systems to be protected in new manners by transitioning from a physical protection system to a virtual protection system. The data may also be replicated by a physical system.

As discussed herein, embodiments of a data protection system may perform replication operations. The data protection system (also referred to herein as a replication system) may include a physical component or system and a virtual component or system. Thus, the source data may be replicated to multiple targets, such as a physical system and/or a virtual system.

The physical replication component may connect to a storage using various protocols such as, by way of example, FC/SCSI/iSCSI or the like. The physical replication component may invoke storage related APIs (Application Programming Interfaces) to manage snap based replication cycles, which may include managing snapshots and snapshot differentials.

The virtual replication component may communicate with a virtual infrastructure (e.g., VCenter and ESXs) to manage virtual machines and prepare the replicated data for consumption. The replicated data may be used as backups or to generate backups, as a failover system, or the like.

FIG. 1 illustrates an example of a system in which a data protection system 100 replicates data from a source or from production data. The data protection system 100 may include a virtual replication system 110 and a physical replication system 120. FIG. 1 illustrates an example of a storage 102, which is an example of a source or of production data. The data protection system 100 may replicate data stored on the storage 102.

The storage 102 may include storage devices and may include arrays or other storage devices or types. The storage devices or the storage provided by the storage devices may be organized into one or more storage groups. In this example, the storage 102 represents a storage group that may include a plurality of volumes 104 (e.g., V1-Vn). The storage 102 may also include snapshots 106 of the volumes 104. In one example, the snapshots 106 includes snapshots S1-Sn, a snapshot for each volume V1-Vn. The snapshots may also be stored on corresponding snapshot volumes.

The storage 102 may also include a journal 108. The snapshots 106 and/or the journal 108 may be different storage devices or groups than the volumes 104. Further, the snapshots 106 may be managed or performed by the data protection system 100. Thus, the data protection system 100 may include other components, such as servers or the like, that may participate in the data protection operations.

As previously stated, the data protection system may include a physical replication system 120 (e.g., a replication protection appliance) and/or a virtual replication system 110. The physical replication system 120 includes storage configured to store the replicated data. The virtual replication system 110 may include a virtual machine 112 and virtual machine disks 114 (VMDK). In one example, the data protection system may include virtual machine disks VMDK1-VMDKn. Each of the virtual machine disks 114 corresponds to one of the volumes 104. Thus, V1 corresponds to VMDK1 and so forth, by way of example only.

Once the data is replicated by the virtual replication system 110, the replicated data can be transferred to the cloud 116 or prepared for other consumption. Further, the virtual replication system 110 may be implemented in the cloud 116 (e.g., in a datacenter).

Before performing protection operations, the virtual replication system 110 is provisioned or initialized. In one example, the virtual machine 112 may be created at the virtual replication site (which may be local or remote from the source or production system). The virtual machine 112 may be provisioned with virtual machine disks 114—one for each of the volumes 104. The volumes 104 may be an example of a consistency group. In a consistency group, by way of example only, all snapshots of the volumes in the consistency group are taken at the same time. This helps ensure that the group are more consistent.

Next, the journal 108 is provisioned. The journal may be exposed to the physical replication system 120 as a journal or as a physical device. The journal 108 may be exposed to the virtual replication system 110 as an RDM journal. A consistency group may be created in the virtual replication system 110. The consistency group will protect the virtual machine 112 and will use the journal 108 for replication purposes. Thus, the virtual disks 114 are consistent with the volumes 104 or with the snapshots 106 after replication is performed by using consistency groups.

Once the data protection system 100 is set up, protection cycles may commence. When this type of system is set up it may be necessary to establish a copy of the volumes 104 in the virtual machine disks 114. As a result, preparing the data protection system 100 to replicate data may have a startup time where all of the data is initially copied or replicated.

In a protection cycle, the physical replication system 120 may perform an SBR cycle. The SBR cycle may also be performed or initiated by the virtual replication system 110. In an SBR cycle, snapshots 106 of the volumes 104 are created (e.g., snapshots S1-Sn for volumes V1-Vn). The physical replication system (and/or the virtual replication system) may also provide or have access to a mechanism that identifies a list (e.g., a change block tracker, bitmaps, differentials) of the changed areas or of the changed data. The changed data is typically with respect to a previous snapshot or replication action. The list typically contains or identifies all changed areas or blocks in the volumes 104. In one example, the list may contain or identify metadata that identifies the source, location, size, and/or length, by way of example only, of each changed data.

After the snapshots 106 are generated, the physical replication system 120 may scan the changed areas using the list and read the data from the snapshots 106. This data read is then written into the journal 108. As a result, the journal 108 holds or stores the data of the changed areas. The journal 108 may also store the changed data in sequence. The journal 108 may also store metadata that identifies which volumes or snapshots the changes are from, and the location and the length of the changed areas.

After the data has arrived in the journal 108, the physical replication system can notify the virtual replication system 110 that the protection cycle has been completed. The virtual replication system 110 then reads from the journal 108 and replicates the data to the virtual machine disks 114 or other target. The data read from the journal 108 can be distributed to the virtual machine disks 114 and/or sent to the cloud 116. The virtual replication system 110 (or the virtual machines 112) can distribute the data based on the metadata. For example, metadata indicating that a set of blocks are from volume 5 are distributed to the corresponding virtual machine disk 5. Also, the virtual replication system 110 may provide other distribution or data protection options as well such as storing the replicated data as backups (e.g., snapshots may be taken of the replicated data to generate backups), or the like.

Figure 2:
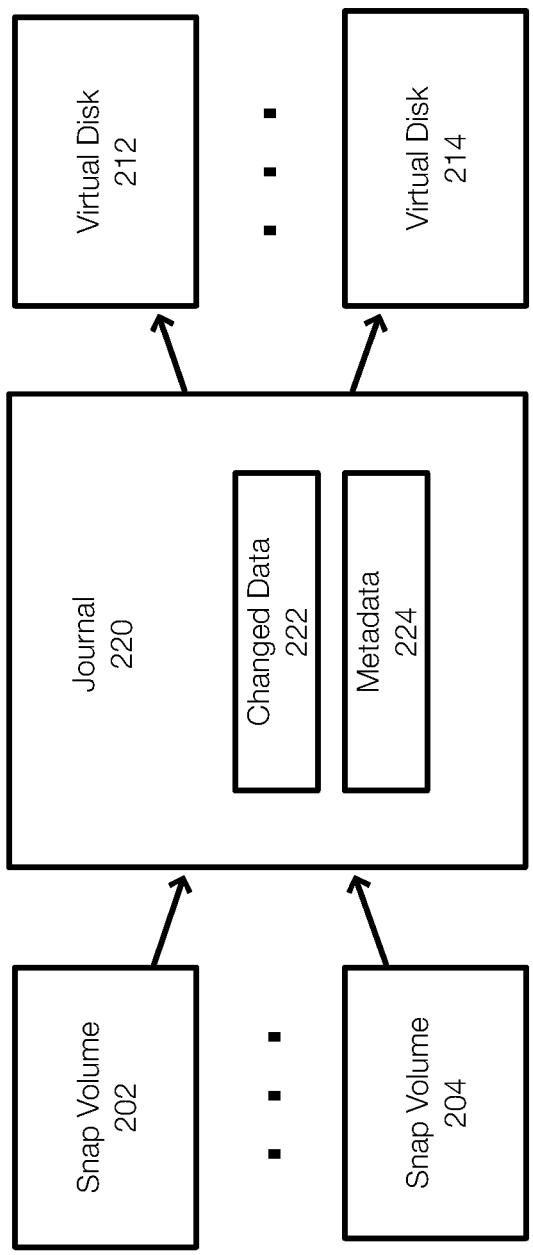
FIG. 2 further illustrates an example replication of a volume to a virtual volume.

FIG. 2 illustrates aspects of a data replication operation in the virtual replication system. FIG. 2 illustrates snap volume 202 (SV1) and snap volume 204 (SVn). During a protection cycle performed by the data protection system, the snap volumes S1-Sn (represented by snap volumes 202 and 204) are generated. The snap volumes S1-Sn may already exist or may have already been provisioned in the production system. During the protection cycle and using a change tracker or other method, the changed blocks or data are read from the snap volumes 202 and 204 and written, in sequence in one example, to the journal 220. As a result, the journal 220 may store the changed data 222 and metadata 224 that describes the changed data 222. The metadata 224 may identify the source, length, and/or other attributes of the changed data 222.

Because the journal can be exposed as an RDM, the virtual replication system can access the journal and replicate the changed data to the virtual disks 212 and 214 (representative of virtual disks 1-n, which correspond to volumes 1-n). In this example, the changed data identified from the snap volume 202 are replicated to the virtual disk 212 and the changed data identified from the snap volume 204 are replicated to the virtual disk 214.

Figure 3:
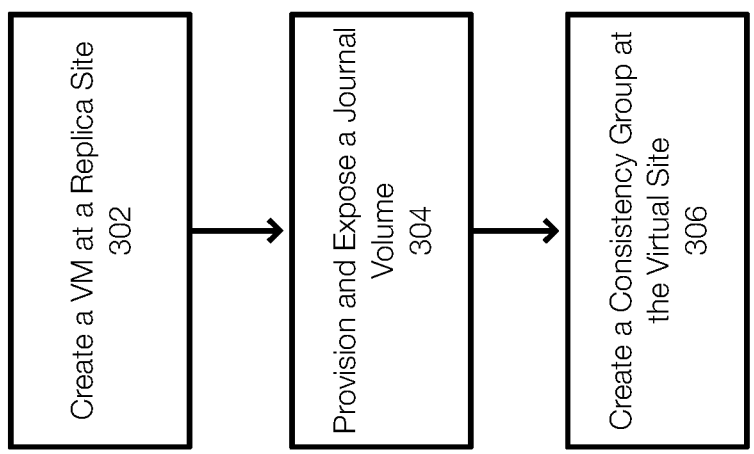
FIG. 3 illustrates an example of a method for provisioning a data protection system that can replicate to both physical and virtual systems.

FIG. 3 illustrates an example of a method for provisioning a data protection system such that the data protection system can perform data protection operations including replication operations. When preparing to perform a replication operation, a virtual machine may be created 302 at a replica site, which is an example of a target. The replica site may be another location that is different from the production site such as the cloud. The replica site may be associated with the same LAN as the source or may be located remotely from the source. In one example, the replica site is configured for disaster recovery and/or business continuity and may be remote from the source. If a negative event occurs with the production data, the replicated data may be used for production purposes. For example, a failover operation to the replica site may be performed if necessary. Creating the virtual machine at the replica site may also include providing the infrastructure associated with a virtual machine.

Next, a journal volume (or journal) is provisioned and exposed 304 at or for the production site. The journal may be configured, mounted, or exposed as a storage device to a physical system and may be exposed, mounted, or configured using raw device mapping to the virtual machine. Raw device mapping allows a storage volume to be exposed as a virtual volume.

Finally, a consistency group may be created 306 at the virtual site. In one example, the consistency group corresponds to the consistency group being replicated. Thus, the consistency group may include or have volumes that correspond to the volumes being replicated.

Figure 4:
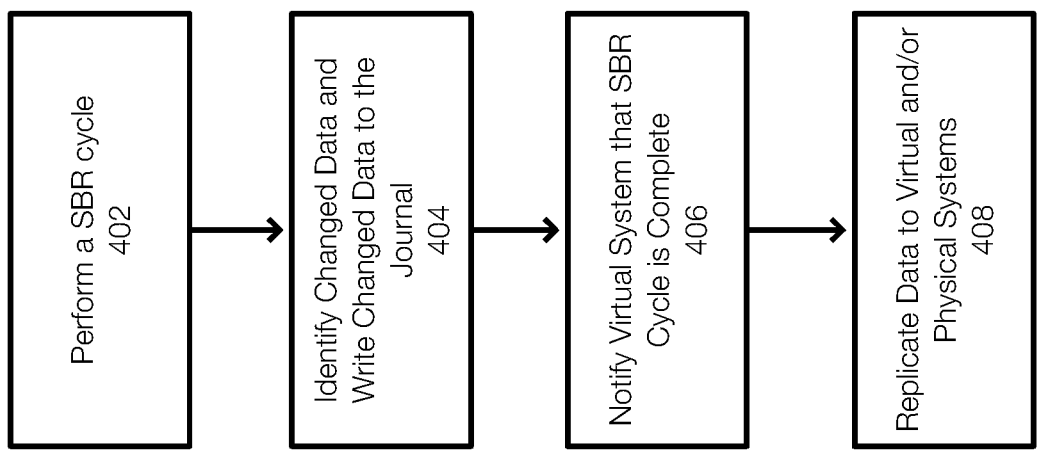
FIG. 4 illustrates an example of a method for replicating data in a virtual and/or a physical system.

FIG. 4 illustrates an example of a method for performing a data protection operation such as a replication operation. In one example, the system may have already been initiated such that the virtual volumes contain data corresponding to the production system. As the production data changes, the replication operation is performed to keep the replicated data consistent with the production data.

The method shown in FIG. 4 includes performing 402 a snap based replication cycle. The SBR cycle may be performed or controlled by a physical component (e.g., a replication appliance) of the data protection system, although the SBR can also be initiated by the virtual replication system. During the SBR cycle, snapshots are created for the volumes in the consistency group being replicated. In addition, a list may be generated that identifies or includes at least all of the changed areas or blocks in the consistency group. The changed data may be relative to a previous snapshot for example or relative to a particular point in time.

Next, the physical component of the data protection system may identify the changed data using the snapshots and the list and write 404 the changed data to the journal. The changed data, after being identified, may be read from the snapshot volumes and then written to the journal. When writing the changed data to the journal, the data may be sequenced in the order the changes were made. This may ensure, for example, that the data is replicated in the manner in which the production data was changed. Metadata is also written to the journal. The metadata identifies which volume or snap volume the changed data came from along with the location and the length of the changed data. Timestamps or other information may be used to sequence the changed data.

In one example, the physical replication system or component may notify 406 the virtual replication system or component that the snapshot cycle is completed. The data is then replicated from the journal to the virtual and/or physical systems from the journal. Because the protection cycle is completed and because data is being read, collisions do not occur. The virtual and physical replication systems or components access the journal in different manners as previously discussed.

Figure 5:
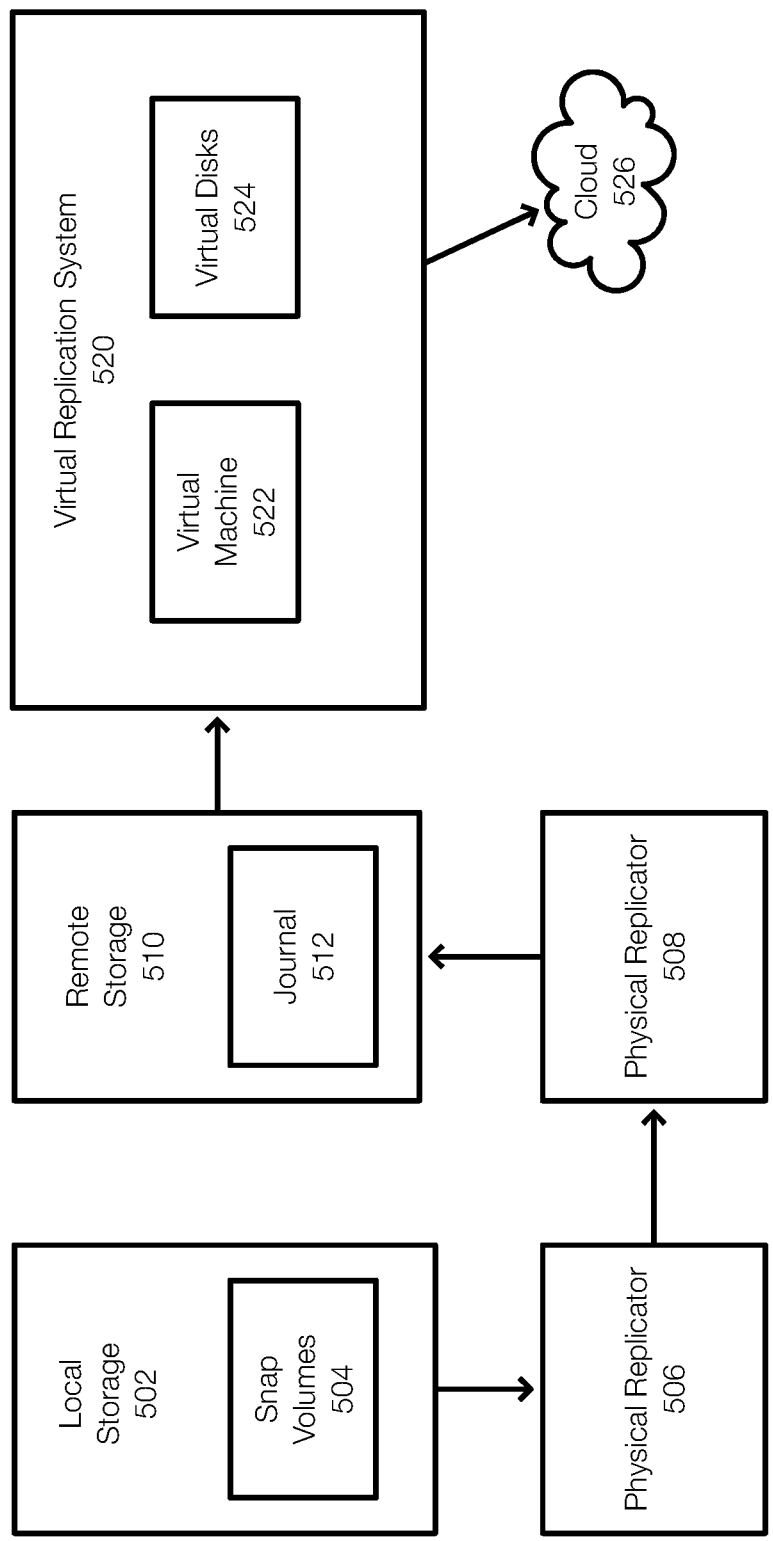
FIG. 5 illustrates an example of a method for remotely replicating data to a virtual system.

FIG. 5 illustrates an example of remote replication. FIG. 5 further illustrates an example of remote cascaded replication. FIG. 5 illustrates a local storage 502 that includes snap volumes 504. The snap volumes 504 contain snapshots of production volumes on the local storage 502.

A physical replication system, which may include physical replicators 506 and 508 (e.g., replication appliances or physical replication systems), replicate the snap volumes 504 or the changed data represented by or derived from the snap volumes 504 to the remote storage 510. The changed data may be stored in a journal 512 at the remote storage 510.

A virtual replication system 520 may be configured to access the journal 512 as previously described. Thus, the virtual machine 522 may write the changes in the journal 512 to the virtual disks 524 and/or to the cloud 526. If necessary, the journal 512 can also be replicated by a physical replication system.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention allow data associated with a physical replication system to also be used with a virtual management paradigm. Data can be managed using a virtual data protection paradigm, which may include sending data to the cloud. Embodiments of the invention allow data protected or replicated by physical protection systems to be protected or replicated by virtual protection operations. As discussed herein, a journal may be used as a cascading mechanism to connect between the two different systems.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations including replication operations, backup operations, restore operations, or the like or combination thereof. Additional operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment and RecoverPoint systems, whether implemented virtually or physically. In general however, the scope of the invention is not limited to any particular data backup platform or data storage environment or other data protection system.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

For any of the aforementioned elements comprise or consist of a virtual machine (VM), that VM may constitute a virtualization of any combination of the physical components disclosed herein. A physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to data protection operations.

Following are some further example embodiments of the invention. These are presented only by way of example and are not intended to limit the scope of the invention in anyway.

Embodiment 1

A method, comprising: A method for replicating data from storage, the method comprising: performing a snapshot based replication on a consistency group that includes a plurality of volumes to generate a plurality of snapshots that are stored on a plurality of snapshot volumes, identifying changes to data in the consistency group in the plurality of snapshots; writing the changes to the data to a journal; and replicating the changes in the journal to a virtual replication system and to a physical replication system.

Embodiment 2

The method of embodiment 1, wherein each of the plurality of snapshots corresponds to one of the plurality of volumes.

Embodiment 3

The method of embodiment 1 and/or 2, wherein writing the changes includes writing metadata to the journal, wherein the metadata associated a volume, a location, and a length with each of the changes.

Embodiment 4

The method of embodiment 1, 2, and/or 3, further comprising exposing the plurality of snapshots as a device such that the physical replication system can read the plurality of snapshots stored on the plurality of snapshot volumes.

Embodiment 4

The method of embodiment 1, 2, 3, and/or 4, further comprising scanning the plurality of snapshots to identify the changes.

Embodiment 5

The method of embodiment 1, 2, 3, 4, and/or 5 further comprising exposing the journal to the physical replication system as a device and exposing the journal to the virtual replication system in a different manner.

Embodiment 6

The method of embodiment 1, 2, 3, 4, 5 and/or 6, further comprising the journal to the virtual replication system using raw device mapping.

Embodiment 7

The method of any of embodiments 1, 2, 3, 4, 5, and/or 6 wherein the virtual replication system includes a virtual machine and a plurality of virtual disks, further comprising replicating the changes to the plurality of virtual disks.

Embodiment 8

The method of any of embodiments 1, 2, 3, 4, 5, 6, and/or 7, further comprising distributing the replicated data to another destination or preparing the replicated data for consumption by an application.

Embodiment 9

The method of embodiment 1, 2, 3, 4, 5, 6, 7, and/or 8, further comprising organizing the plurality of virtual disks as a consistency group that corresponds to the consistency group that includes the plurality of volumes being replicated.

Embodiment 10

A method for replicating data, the method comprising: provisioning a journal volume that is associated with volumes and snapshot volumes; configuring the journal volume such that the journal volume is exposed as a journal to a physical replication system and as a raw disk mapped journal to a virtual replication system; after completing a protection cycle that generates snapshots of the plurality of volumes that are stored on the snapshot volumes, wherein changes to data stored in the volumes is identified during the protection cycle; and replicating the journal volume by the virtual replication system.

Embodiment 11

The method of embodiment 10, further comprising determining the changes to the data from the snapshots stored in the snapshot volumes.

Embodiment 12

The method of embodiment 10 and/or 11, further comprising writing the changes to the journal volume and writing metadata to the journal volume, wherein the metadata identifies locations, length, and size of the changes to the data.

Embodiment 13

The method of embodiment 10, 11, and/or 12, further comprising accessing the journal volume, by the virtual replication system, using raw device mapping to replicate the changes to the data to the virtual replication system.

Embodiment 14

The method of embodiment 10, 11, 12, and/or 13, further comprising replicating the changes to virtual disk volumes, each virtual disk volume corresponding to one of the volumes.

Embodiment 15

The method of embodiment 10, 11, 12, 13, and/or 14, further comprising generating a list of the changes to the data.

Embodiment 16

The method of embodiment 10, 11, 12, 13, 14, and/or 15, further comprising identifying the changes using a change block tracker, a bitmap, or a differential.

Embodiment 17

A non-transitory storage medium having stored therein instructions that are executable by one or more hardware processors to perform the operations of any one or more of or combinations of embodiments 1 through 16.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating data from storage, the method comprising:
    performing, by a physical system, a snapshot based replication on a consistency group that includes a plurality of volumes to generate a plurality of snapshots that are stored on a plurality of snapshot volumes;
    identifying changes to data in the consistency group from the plurality of snapshots;
    writing the changes to the data to a journal, wherein the journal is a physical device and is connected to the physical system;
    cascading the snapshot based replication performed by the physical system by:
        notifying a virtual replication system that the changes have been written to the journal;
        exposing the journal such that the virtual replication system can read the journal;
        reading the changes to the data in the journal by the virtual replication system; and
        distributing the changes read from the journal to a target.

2. The method of claim 1, wherein each of the plurality of snapshots corresponds to one of the plurality of volumes.

3. The method of claim 1, wherein writing the changes includes writing metadata to the journal, wherein the metadata associates a volume, a location, and a length with each of the changes.

4. The method of claim 1, further comprising exposing the journal to the physical replication system as a device and exposing the journal to the virtual replication system in a different manner.

5. The method of claim 4, further comprising exposing the journal to the virtual replication system using raw device mapping.

6. The method of claim 1, wherein the virtual replication system includes a virtual machine and a plurality of virtual disks, further comprising replicating the changes to the plurality of virtual disks.

7. The method of claim 1, further comprising distributing the changes to the data replicated to the virtual replication system to another destination or preparing the data replicated to the virtual replication system for consumption by an application.

8. The method of claim 1, further comprising organizing a plurality of virtual disks as a consistency group that corresponds to the consistency group that includes the plurality of volumes being replicated.

9. A method for replicating data, the method comprising:
    provisioning a device to store a journal, wherein the device is associated with volumes and snapshot volumes;

exposing the journal as the device to a physical replication system;
exposing the journal as a raw disk mapped journal to a virtual replication system;
performing a protection cycle, by the physical replication system, that generates snapshots of the volumes, wherein the snapshots are stored on the snapshot volumes;
identifying changes to the data stored in the volumes for the protection cycle;
writing the changes, by the physical replication system, to the journal; and
cascading the protection cycle performed by the physical replication system to the virtual protection system by:
notifying the virtual replication system that the changes are written to the journal; and
replicating the journal by the virtual replication system, wherein the virtual replication system the journal to replicate the changes to data stored in the journal to a target.

10. The method of claim 9, further comprising determining the changes to the data from the snapshots stored in the snapshot volumes.

11. The method of claim 10, further comprising writing writing metadata to the journal, wherein the metadata identifies locations, length, and size of the changes to the data.

12. The method of claim 9, wherein notifying the virtual replication system ensures that the physical replication system and the virtual replication system do not collide in accessing the journal.

13. The method of claim 9, further comprising replicating the changes in the journal by the virtual replication system to virtual disk volumes, each virtual disk volume corresponding to one of the volumes.

14. The method of claim 9, further comprising generating a list of the changes to the data.

15. The method of claim 14, further comprising identifying the changes using a change block tracker, a bitmap, or a differential.

16. A non-transitory computer readable medium comprising computer executable instructions for performing a method for replicating data from a physical system, the method comprising:
provisioning a device to store a journal, wherein the device is associated with volumes and snapshot volumes;
exposing the journal as the device to a physical replication system;
exposing the journal as a raw disk mapped journal to a virtual replication system;
performing a protection cycle, by the physical replication system, that generates snapshots of the volumes, wherein the snapshots are stored on the snapshot volumes;
identifying changes to the data stored in the volumes for the protection cycle;
writing the changes, by the physical replication system, to the journal; and
cascading the protection cycle performed by the physical replication system to the virtual protection system by:
notifying the virtual replication system that the changes are written to the journal; and
replicating the journal by the virtual replication system, wherein the virtual replication system accesses the journal to replicate the changes to data stored in the journal to a target.

17. The non-transitory computer readable medium of claim 16, further comprising determining the changes to the data from the snapshots stored in the snapshot volumes; and writing metadata to the journal volume, wherein the metadata identifies locations, length, and size of the changes to the data.

18. The non-transitory computer readable medium of claim 16, wherein notifying the virtual replication system ensures that the physical replication system and the virtual replication system do not collide in accessing the journal.

19. The non-transitory computer readable medium of claim 16, further comprising replicating the changes, by the virtual replication system, to virtual disk volumes, each virtual disk volume corresponding to one of the volumes.

20. The non-transitory computer readable medium of claim 16, further comprising generating a list of the changes to the data.

* * * * *